March 3, 1959 — W. M. SHOFFNER — 2,875,713
ROOT FEEDER
Filed Jan. 19, 1955
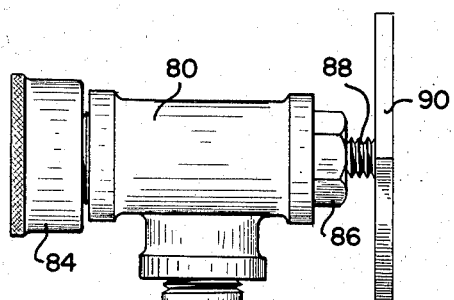
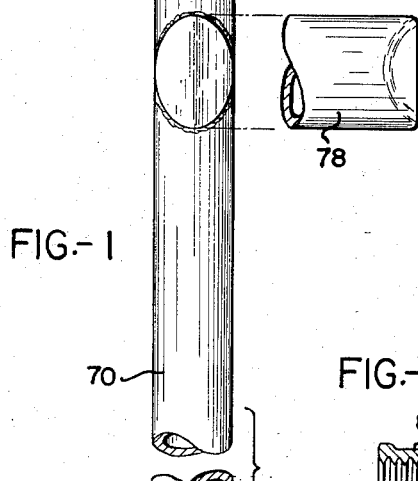
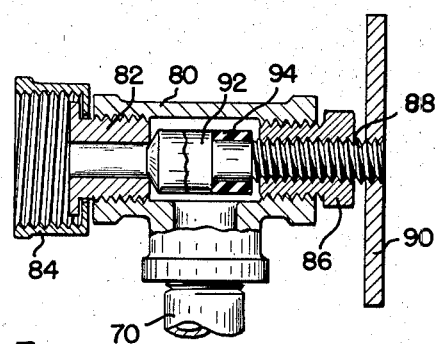
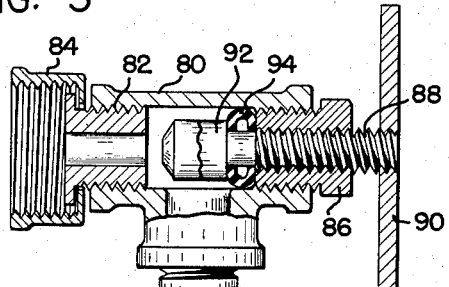
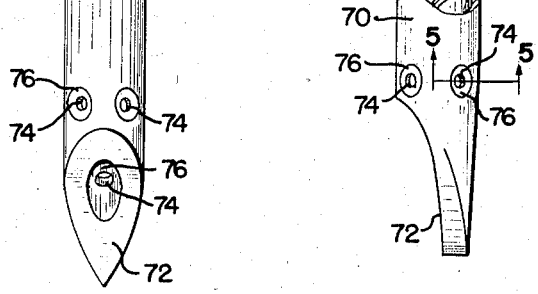
INVENTOR.
WILLIE M. SHOFFNER
BY *Toulmin & Toulmin*
ATTORNEYS

United States Patent Office 2,875,713
Patented Mar. 3, 1959

2,875,713

ROOT FEEDER

Willie M. Shoffner, Dayton, Ohio

Application January 19, 1955, Serial No. 482,741

1 Claim. (Cl. 111—7.1)

This invention relates to gardening equipment, and particularly to a device known as a root feeder.

Root feeders are known in the art and take the form of a fairly long tube, about the size of a one-fourth inch iron pipe, having apertures in the lower end thereof and with the lower end closed and, preferably, pointed.

These tubes are adapted for connection with a source of water under pressure and are pushed into the ground to supply water to the roots of trees and the like, and to supply water to the soil underneath grass areas.

Such devices ordinarily have a valve mounted on the upper end, and the valve is of a special nature so that it can be availed of for pushing the tube downwardly into the ground.

The usual type root feeder also has holes drilled in the lower end thereof through which the water will pass. These holes tend to become stopped up with earth, particularly when the soil is of a sticky nature.

Having the foregoing in mind, it is a primary object of the present invention to provide a root feeder in which the difficulties in connection therewith referred to above are eliminated.

A particular object of the present invention is to provide a root feeder which can readily be inserted into the ground under the most difficult conditions without the possibility of damaging the root feeder in any way whatsoever.

Another particular object of this invention is the provision of a root feeder of the nature referred to which is easy to remove from the ground without the possibility of bending or damaging the root feeder in any way.

A further object of the present invention is the provision of a root feeder having a special point formed thereon which facilitates introducing the root feeder into the ground.

Still another object of the present invention is the provision of a root feeder of the nature referred to in which the discharge apertures are so formed as to prevent their becoming stopped up with earth.

These and other objects and advantages of this invention will become more apparent upon reference to the following specification taken in connection with the accompanying drawings, in which:

Figure 1 is an elevational view of the root feeder according to my invention;

Figure 2 is a sectional view showing the valve of the Figure 1 embodiment closed;

Figure 3 is a view like Figure 2 but shows the valve open;

Figure 4 is a side view of the point of the feeder; and

Figure 5 is a sectional view indicated by line 5—5 on Figure 4 showing how the holes are formed in the tube.

In the embodiment of the invention of Figures 1 through 5 the root feeder comprises a tube 70 which is pinched-together at its lower end as at 72 and sealed and hardened in any suitable manner, such as by cyanide treatment, and with the discharge apertures 74 being formed therein about the tube and at least one being formed in the end of the pinched-together tube in about the axis thereof.

Each of the apertures 74 is formed, as in Figure 5, with a counter-sunk outer portion 76. This is effective for preventing soil from stopping up the apertures, because the soil does not get into the smaller part of the aperture and will readily be dislodged from the counter-sunk portion of the aperture.

Adjacent the upper end the tube has fixed thereto a laterally projecting handle portion 78, by means of which the feeder is pushed into the ground. According to the present invention a novel valve means is provided on the extreme upper end of the tube in the form of a standard T 80, which is provided at its one end with a member 82 threaded into the end of the T that has associated therewith a member 84 which can be attached to the end of a conventional hose.

At the other end of the T there is threaded the member 86, which is centrally threaded and tapped to receive threaded stem 88, having a square handle 90 for rotating it. Stem 88 extends into the space within the T between members 82 and 86 and has an enlarged end part 92 forming a valve member for seating against the inner end of member 82.

Valve member 92 is preferably coated with lead or any other fairly soft metal or alloy so that it will readily engage member 82 in sealing relation. On the stem immediately rearwardly of the valve member 92 is a plastic sleeve 94 which, when the valve member is opened as in Figure 3, forms a seal between the valve member and stem and the stationary parts of the valve so that no leakage will occur about the stem, which forms an inexpensive and highly effective seal arrangement.

The root feeder of Figures 1 through 5 can readily be inserted into the ground by at least cracking the valve at the upper end thereof and pushing downwardly on the rood feeder, availing of the hand-graspable member 78 and the T 80 and turning the feeder on its axis, if necessary, so that the sharpened offset point at 72 will cut into the ground while the flow of water through the tube into the ground will soften the ground ahead of the tube and about the end thereof, and also prevent the apertures 74 from becoming stopped up.

It will be understood that this invention is susceptible to modification in order to adapt it to different usages and conditions and, accordingly, it is desired to comprehend such modifications within this invention as may fall within the scope of the appended claim.

I claim:

In a root feeder, a length of pipe with the wall at one end being pinched together to form a wedge laterally offset from the axis of the pipe, there being an aperture drilled through said pinched wall on the axis of said pipe, there being a plurality of radial apertures in said pipe immediately above said closed end and said apertures being radially distributed, said axial aperture and said radial apertures each having a tapered wide angle counter sink at its other end, said axial aperture being substantially smaller than the diameter of said pipe so that soil will remain loose in the counter sink to be worked free by the water discharged from said axial aperture and by virtue of the offset wedge to prevent the soil from stopping said axial aperture, a pipe T with its lateral branch being received on the other end of said pipe, valve means in said pipe T having means for connection to a supply conduit and operable for controlling the supply of fluid to said pipe, and a laterally extending cylindrical member secured to said pipe below said T to form a hand grip for use in forcing the pipe into the ground.

References Cited in the file of this patent

UNITED STATES PATENTS

| | | |
|---|---|---|
| 1,021,681 | Jennings | Mar. 26, 1912 |
| 1,452,811 | Mueller | Apr. 24, 1923 |
| 1,484,740 | Rubino | Feb. 26, 1924 |
| 1,937,172 | Starner et al. | Nov. 28, 1933 |
| 2,027,005 | Tatroe | Jan. 7, 1936 |
| 2,214,083 | Lester | Sept. 10, 1940 |
| 2,270,325 | Matthews | Jan. 20, 1942 |
| 2,333,727 | Lucas | Nov. 9, 1943 |
| 2,478,350 | Wirz | Aug. 9, 1949 |
| 2,505,174 | Daniels | Apr. 25, 1950 |
| 2,625,123 | Morgan | Jan. 13, 1953 |
| 2,694,547 | MacGregor | Nov. 16, 1954 |